United States Patent [19]

Robert et al.

[11] Patent Number: 4,476,203

[45] Date of Patent: Oct. 9, 1984

[54] LEAD-ACID BATTERY CELLS AND MANUFACTURING PROCESS THEREOF

[75] Inventors: Jack Robert, Palaiseau; Jean Alzieu, Paris, both of France

[73] Assignee: Agence Nationale de Valorisation de la Recherche ANVAR, Neuilly Sur Seine, France

[21] Appl. No.: 196,490

[22] PCT Filed: Oct. 4, 1979

[86] PCT No.: PCT/FR79/00091

§ 371 Date: Jun. 4, 1980

§ 102(e) Date: Apr. 29, 1980

[87] PCT Pub. No.: WO80/00766

PCT Pub. Date: Apr. 17, 1980

[30] Foreign Application Priority Data

Oct. 4, 1978 [FR] France .............................. 78 28386

[51] Int. Cl.³ ............................................. H01M 2/18
[52] U.S. Cl. .................................... 429/139; 429/147; 429/225
[58] Field of Search ................. 429/139, 147, 225–229

[56] References Cited

U.S. PATENT DOCUMENTS

| | | | |
|---|---|---|---|
| 2,318,498 | 5/1943 | Keen | 429/139 |
| 2,866,841 | 12/1958 | Zohn | 429/139 |
| 3,172,782 | 3/1965 | Jache | 429/147 |
| 3,201,280 | 8/1965 | Yumoto | 429/131 X |
| 3,625,772 | 12/1971 | Himy | 429/139 |
| 4,037,030 | 7/1977 | Sobatino | 429/139 |
| 4,086,119 | 4/1978 | Vecchiotti | 429/139 X |

Primary Examiner—Charles F. LeFevour
Attorney, Agent, or Firm—Cushman, Darby & Cushman

[57] ABSTRACT

A lead-acid battery cell wherein each cell includes a compressed assembly of negative plates (2,3), separators (5) and positive plates (1).

The positive plates (1) are sandwiched between two microporous separator elements (4) having dimensions greater than that of the plates and the plate edges are coated with an epoxy resin ribbon (20), which is provided by pouring resin into the channel between the projecting portions of the separators.

5 Claims, 6 Drawing Figures

U.S. Patent    Oct. 9, 1984    4,476,203
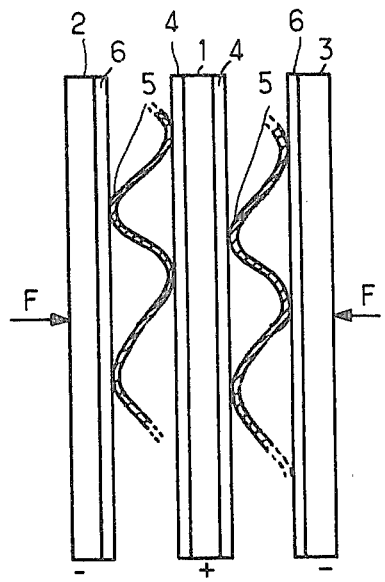
Fig:1
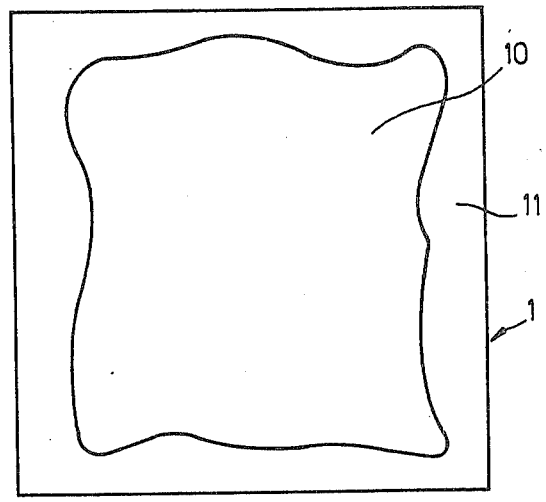
PRIOR ART
Fig:2
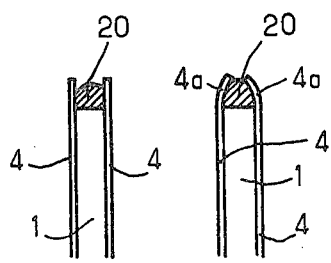
Fig:3A    Fig:3B
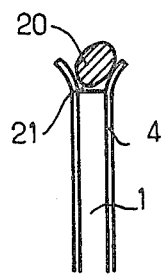
Fig:3c
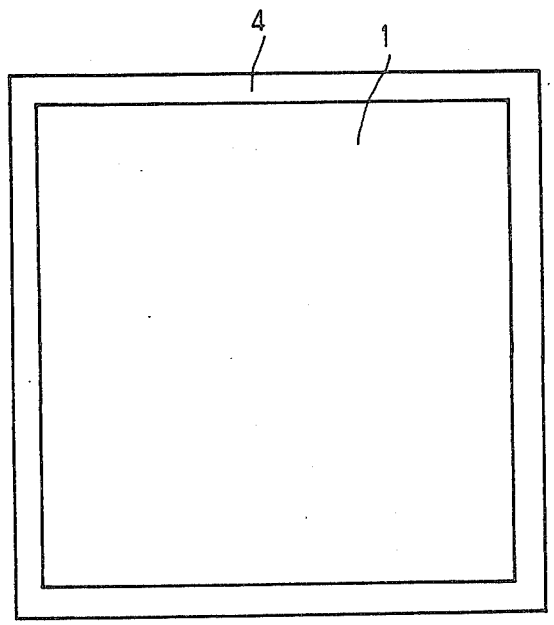
Fig:4

LEAD-ACID BATTERY CELLS AND MANUFACTURING PROCESS THEREOF

FIELD OF THE INVENTION

This invention relates to improvements to lead-acid storage batteries having a long life.

The invention relates especially to lead-acid storage batteries which are able to withstand very quick charges, lasting about half an hour, with discharge times of approximately two hours, which corresponds to motor car requirements.

SUMMARY OF THE INVENTION

The invention will be better understood by the following description of certain preferred embodiments in conjunction with the accompanying drawings in which:

FIG. 1 is a view showing an embodiment of a cell of a lead-acid storage battery according to the present invention;

FIG. 2 shows a pattern of the deteriorating areas of a positive plate in a battery cell; and, FIGS. 3A, 3B, 3C and 4 are views illustrating the present invention.

DETAILED DESCRIPTION OF THE PREFERRED EMBODIMENTS

The present invention relates especially to cells for lead-acid batteries, such as that illustrated in FIG. 1, including a center positive plate 1 which is sandwiched between two negative plates 2 and 3. Between positive plate 1 and each of negative plates 2 and 3, is included a set of separator elements including successively, for example, a microporous flat shim 4, such as a Darak product made of paper pulp, glass wool and phenolic resin, an ondulated and perforated spacing element 5 made, for example, of PVC, and, an element 6 such as a fibrous mat. A pressure, illustrated by arrow F, is exerted against the storage battery cell. Of course, a plurality of storage battery cells, of a type illustrated in FIG. 1, can be paralellelly or series assembled, the pressure being applied to the whole assembled cell.

The inventors have experimentally found that structures such as that illustrated in FIG. 1, which were submitted to comparatively high pressures, for example, of about 0.4 or 1 bar or more, would allow to provide long life lead-acid storage battery cells withstanding one thousand charge-discharge cycles or more, with the charge duration being about half an hour and the discharge one about two hours. Comparatively, it will be noted that conventional lead-acid storage battery cells cannot exceed one hundred charge-discharge cycles when used at such a rate.

The inventors have checked lead-acid storage battery cells, such as the cells described in the foregoing with reference to FIG. 1, at the end of the life of the storage battery, i.e. when the storage capacity thereof becomes too low. It is mainly the positive plate which shows some defects. Such defects, corresponding to a deterioration of the active material, are substantially spread according to the pattern illustrated in FIG. 2: namely, the center portion 10 of the plate shows substantially no deterioration, whilst a comparatively important deterioration can be seen in the side areas 11.

Experiences carried out by the inventors have shown that such a deterioration of the side areas could be reduced by surrounding the positive plate with a material holding the active material within the positive plate. The life of the so obtained storage battery is increased.

FIG. 3A shows an embodiment of the present invention, wherein positive plate 1 is inserted between two microporous elements formed with shims 4, said microporous elements having an area higher than that of the plate and protruding on all the edges thereof, as illustrated in the front view of FIG. 4. In the passage formed between the projecting ends of microporous elements 4 is placed a line or cord 20 of epoxy resin, resistant to sulphuric acid, which covers the plate edges in order to prevent the active material from escaping and therefore to obtain a sealed assembly. Such an epoxy resin can be, for example, the product "A-32 glue" made by the Kodak company.

It is advisable to make sure that the epoxy resin line perfectly adheres to the edges of plate 1 and that the passage is free from intermediary bubbles. For that purpose, as illustrated in FIG. 3B, the ends 4a of microporous elements 4 are preferably shaped in order to face each other. In fact, should said ends slightly divert, as illustrated, for example, in FIG. 3C, air gaps could form between the line of resin and the plate edge. An example of such a gap is indicated by the reference numeral 21 in FIG. 3C.

It will be understood that the provision of a line of resin only constitutes an embodiment of the present invention and those skilled in the art will be able to design other means to protect the positive plate ends, for example, by designing strip shaped-elements which pinchingly fit the plate ends.

Other configurations of separator elements differing from that illustrated in FIG. 1 can be suggested by those skilled in the art, specially configurations including 4 elements.

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

We claim:

1. A battery cell assembly for a lead acid storage battery including:
    a box,
    at least one battery cell assembly within said box,
    means for applying onto said battery cell assembly a lateral pressure of at least 0.4 bar,
    an electrolyte filling said box,
    said battery cell assembly comprising at least one positive plate and at least one negative plate and interposed between said plates a plurality of successive separator elements including at least one corrugated perforated sheet of polyvinylchloride,
    said positive plate having flat opposed lateral surfaces and being sandwiched between two flat microporous separator elements each extending all over said lateral surface of said positive plate, the whole peripheral edges of said positive plate being covered with a protective material sealingly holding the active material of said plate.

2. A cell as defined in claim 1 wherein the protective material is an epoxy resin.

3. A cell assembly as in claim 2, wheren said flat microporous separator elements have a peripheral projecting part projecting from the peripheral edges of said positive plate, forming therebetween a peripheral passage, said protective resin being deposited within said passage.

4. A cell as defined in claim 3, wherein the projecting parts of said microporous separator elements converge toward each other.

5. A cell assembly as in claim 1, wherein said successive separator elements between said positive and said negative plates include a glass fiber mat contacting said negative plate.

* * * * *